United States Patent
Adelman et al.

[11] Patent Number: 6,072,021
[45] Date of Patent: Jun. 6, 2000

[54] COPOLYMERIZATION OF FORMALDEHYDE AND CYCLIC ETHERS USING INITIATORS BASED UPON TETRAPHENYL BORATES

[75] Inventors: Douglas John Adelman; Richard Beckerbauer, both of Wilmington, Del.

[73] Assignee: E. I. du Pont de Nemours and Company, Wilmington, Del.

[21] Appl. No.: 09/176,609

[22] Filed: Oct. 21, 1998

Related U.S. Application Data

[60] Provisional application No. 60/063,503, Oct. 24, 1997.

[51] Int. Cl.[7] ............... C07D 317/01; C07D 321/12; C08G 2/22; C08G 4/00
[52] U.S. Cl. ............... 528/241; 549/472; 585/422; 528/246; 528/250; 528/405; 528/425
[58] Field of Search .................... 549/347, 472; 585/422; 528/241, 246, 250, 405, 425

[56] References Cited

U.S. PATENT DOCUMENTS

| | | | |
|---|---|---|---|
| 3,803,094 | 4/1974 | Ishi et al. | 260/67 |
| 5,641,853 | 6/1997 | Drysdale | 528/233 |

FOREIGN PATENT DOCUMENTS

| | | |
|---|---|---|
| 0 046 081 | 2/1982 | European Pat. Off. . |
| 2 006 457 | of 1970 | United Kingdom . |
| WO 94 09055 | 4/1994 | WIPO . |

OTHER PUBLICATIONS

*Encyclopedia of Polymer Science and Engineering*, 2$^{nd}$ Ed., Wiley, New York, c1985.
Strauss, *Chemical Reviews*, 93, 927ff, 1993.
Jia et al., *Organometallics*, 16, 842ff, 1997.
Chen, *Journal of Polymer Science*, 14, 129ff, 1976.
Kedrina et al., *Polymer Science*, 33, 799ff, 1991.
Kubisa, *Polimery*, 21, 393ff, 1976.
Research Disclosure, No. 11513, XP002091374, pp. 13–14, Nov. 1973.

*Primary Examiner*—Johann Richter
*Assistant Examiner*—Taofiq A. Solola

[57] ABSTRACT

This invention concerns a process for the copolymerization of formaldehyde with cyclic ethers, the process comprising combining in a hydrocarbon solvent a cyclic ether, a cationic initiator comprising an anion formed from tetraphenyl borate derivatives, and mixtures thereof, and a cation, and anhydrous formaldehyde. These initiators provide high activity, high cyclic ether incorporation rates, and stability while minimizing the production of by-products.

13 Claims, No Drawings

COPOLYMERIZATION OF FORMALDEHYDE AND CYCLIC ETHERS USING INITIATORS BASED UPON TETRAPHENYL BORATES

This application claims the priority benefit of U.S. Provisional Application no. 60/063,503, filed Oct. 24, 1997.

FIELD OF THE INVENTION

This invention provides for a process for copolymerization of formaldehyde with cyclic ethers using cationic initiators having counterions of tetraphenyl borate derivatives. Said initiators provide high activity, high cyclic ether incorporation rates, and stability while minimizing the production of by-products.

BACKGROUND OF THE INVENTION

Numerous cationic species which initiate the copolymerization of formaldehyde with cyclic ethers are known in the art. The practical problems associated with copolymerization of formaldehyde and cyclic ethers involve attaining high molecular weight, minimal by-products, and effective incorporation of the cyclic ether monomer into the polymer.

$BF_3$-etherate initiators are the best known in the art for initiating polymerization of cyclic acetals or ethers, including copolymers. See for example *Encyclopedia of Polymer Science and Engineering*, 2nd ed., Wiley, New York, c1985. However, use of $BF_3$-etherate in the copolymerization of formaldehyde and cyclic ethers requires undesirably large equilibrium concentrations of the cyclic ether in the reaction medium, aggravating problems of waste disposal and necessitating recycling.

Strauss, *Chemical Reviews*, vol. 93, pp 927ff (1993), identifies the tetraphenylborate anions, and particularly the fluoro-substituted tetraphenyl borates, as particularly useful counterions for catalyzing olefin polymerizations because of the combination of very weak coordination, high stability, and an absence of strong basic sites on the periphery. Fluoro-substituted tetraphenyl borates and derivatives are disclosed as being more weakly coordinating anions than, among others, $SbF_6^-$, $AsF_6^-$, $PF_6^-$, and $BF_4^-$.

Jia et al., *Organometallics*, vol. 16, pp. 842ff (1997) disclose metallocene olefin polymerization catalysts based upon counterions of tetrakis(pentafluorophenyl)borate and its derivatives. Cationic catalysts based thereon exhibit higher activity and better stability than the corresponding catalysts based upon $Me(C_6F_5)_3^-$, where "Me" is methyl. Further disclosed is improved solubility in non-polar solvents of tetrakis(pentafluorophenyl)borate based counterions when lipophilic, sterically hindered, p-electron withdrawing groups are substituted on the aromatic rings. Exemplified are substitution of tert-butyldimethyl silyl or triisopropylsilyl for one of the fluorines in each aromatic ring. The unsubsituted tetrakis(pentafluorophenyl)borate was the most weakly coordinating, although the activities of the substituted species were higher.

Chen, *Journal of Polymer Science*, vol. 14, pp 129ff (1976), discloses copolymerization of trioxane and ethylene oxide to form polyoxymethylene copolymer catalyzed by p-chlorophenyl diazonium cations complexed with hexafluoro anions formed from Group VA elements including phosphorous, arsenic, and antimony. It is disclosed that the nature of the anion controls the chain transfer process as well as propagation and side reactions. p-Chlorophenyl diazonium hexafluoroantimonate was found to produce numerous side reactions and polymer of low molecular weight while the arsenate yielded high molecular weight and few side reactions.

Kedrina et al., *Polymer Science*, vol. 33, pp. 799ff (1991) disclose copolymerization of formaldehyde with 1,3-dioxolane to form polyoxymethylene copolymers. Comparison is made between $BF_3$-etherate catalyst and perfluoroalkane sulphonic acids. Reacting in hexane, PFSA was found to be more selective for dioxolane than $BF_3$-etherate. At 0.75 mol/l of dioxolane using PFSA catalyst, polymer containing greater than 7 mol-% dioxolane having a number average molecular weight greater than $6 \times 10^5$ was formed. Polymer having ca. 3 mol-% dioxolane was formed at dioxolane concentration of ca. 0.25% dioxolane, resulting in polymer of ca. $2 \times 10^5$ molecular weight.

Kubisa, *Polimery*, vol. 21, pp. 393ff (1976) discloses homopolymerization of dioxolane using triphenyl methyl (trityl) cations complexed with $SbF_6^-$, $SbCl_6^-$, $AsF_6^-$, and $BF_4^-$.

Brown, German Preliminary published application No. DT 2 006 457 (1970), achieves high rates of incorporation of dioxolane in copolymerization with formaldehyde at high molecular weights using antimony hexafluoride counterion with a number of cations including triethyloxonium and triphenylmethyl carbenium.

SUMMARY OF THE INVENTION

The present invention provides for a process for the copolymerization of formaldehyde with cyclic ethers, the process comprising contacting, in a reactor, a hydrocarbon liquid, a cyclic ether, a cationic initiator comprising an anion formed from tetraphenyl borate derivatives and a cation, and anhydrous formaldehyde.

DETAILED DESCRIPTION OF THE INVENTION

While initiators derived from tetraphenyl borate anions are known in the art as active, stable polymerization initiators for the cationically initiated polymerization of polyolefins, there is no teaching in the art regarding the employment of these initiators in the copolymerization of formaldehyde and cyclic ethers.

It is surprising that these initiators, which differ considerably from those known in the art, are highly effective initiators for the preparation of polyoxymethylene copolymers.

In a particularly surprising aspect of the invention, the process of this invention is highly selective for the cyclic ether comonomer, leading to desirably high rates of incorporation of the cyclic ether comonomer, with a high degree of randomness, into the polymer, leaving little residual concentration of cyclic ether in the process waste stream, and with little side reaction.

In yet another surprising aspect, it is found in the practice of the invention that polymerization stops when no cyclic ether is present. It is not clear whether initiation does not occur, or whether initiation occurs but propagation does not occur. Formaldehyde cannot be homopolymerized according to the process of the present invention. This is especially surprising considering how readily formaldehyde polymerization can usually be initiated. It has been found in the practice of this invention that a starting concentration of about 0.01 molar of cyclic ether is sufficient for reaction.

The process of the present invention can be conducted as a continuous or semi-batch polymerization. One embodiment of the semi-batch polymerization process of the invention comprises combining formaldehyde, cyclic ether comonomer, preferably dioxolane, a cationic initiator comprising an anion formed from tetraphenyl borate derivatives and a cation, and a hydrocarbon liquid in a reaction vessel, heating the mixture to a temperature in the range of 0–80° C., preferably 40–50° C. while agitating, followed by cooling and separation of the product by filtration. In this embodiment, formaldehyde and the cyclic ether comonomer are added throughout the polymerization as they are consumed, but no significant fraction of the product is removed until the reaction is terminated, and no initiator or solvent is added during the polymerization. During semi-batch runs, small samples may be removed, for example in order to perform compositional analysis, but such samples must represent no more than ca. 10% of the total volume of the initial charge.

A batch polymerization, wherein all the ingredients are placed in a vessel at the start of the polymerization, and nothing further is added, is not a practical alternative for the process of the invention because the low solubility of formaldehyde in the hydrocarbon solvent reaction medium would result in the production of very little polymer.

An alternative embodiment of the present invention is a continuous polymerization wherein formaldehyde, cyclic ether comonomer, preferably dioxolane, initiator and hydrocarbon reaction medium are combined under agitation in a reaction vessel, heated to a temperature in the range of 0–80° C., preferably 40–50° C. Total residence time in the reactor is in the range of 10 to 60 minutes, preferably 30 to 40 minutes.

In either semi-batch or continuous polymerization, solids content of 50 weight % or less, preferably 25–35 weight % is maintained during the reaction. Higher solids content interferes with agitation of the polymerization medium. An initial charge of polymer particles is preferably added to aid in particle nucleation to produce a granular and more readily handled product.

In either semi-batch or continuous embodiments of the process of the invention, the molar feed ratio of HCHO to dioxolane is maintained in the range of 200:1 to 50:1, preferably 80:1 to 60:1. The molar feed ratio is replicated in the comonomer concentration in the final polymer produced by the process of the invention.

The polymer product of the process of the present invention is isolated by filtration, washed with an organic solvent, such as acetone, and dried under vacuum at room temperature.

In one embodiment of the semi-batch process of the present invention, polymerizations are carried out in glass reactors equipped with a mechanical stirrer, thermocouple, entry and sample ports, and immersed in a circulating water temperature bath. Formaldehyde, containing less than 600 ppm, preferably less than 300 ppm, of protic solvents, is fed by demand. Prior to use in the polymerization the reactor is dried, then charged under nitrogen with anhydrous n-heptane and heated to a starting temperature of 40–50° C. The nitrogen purge is then removed, the solvent is saturated with formaldehyde for 0.5 min. to 1 min, initiator is added, and dioxolane comonomer feed from a syringe pump is started.

Suitable hydrocarbon liquids to serve as the reaction medium for the process of the invention include cyclic or acyclic alkanes or aromatic hydrocarbons, with heptane and cyclohexane preferred.

Suitable cyclic ethers include ethylene oxide, 1,3-dioxolane, 1,3,5-trioxycylcoheptane, 1,3,6-trioxycyclooctane, and 1,3-dioxycycloheptane with 1,3-dioxolane preferred.

Most cationic species with even moderate reactivity should be able to start the polymerization of formaldehyde, while any which is effective at ring opening will initiate copolymerization with cyclic ethers. The size of the cation is not of importance. Simple ions such as sodium are less preferred because of low reactivity and low solubility in the reaction medium.

The problems in the copolymerization of formaldehyde with cyclic ethers have to do with the propagation of the reaction, not its initiation. As taught by Chen, hereinabove cited, it is the anionic counterion which strongly influences the propagation of the reaction. A desirable counterion will be stable, highly selective for the cyclic ether comonomer, and afford little opportunity for chain transfer or side reactions.

In cationic polymerizations, reactivity is observed to increase with Lewis acidity. Comonomer selectivity, on the other hand, is not well understood. Higher Lewis acidity is associated with extremely weak/extremely labile metal-ligand bonds. This is of particular significance in a low dielectric constant medium such as a hydrocarbon solvent. Weaker coordination generally follows from larger size counterions having greater charge delocalization as a result of numerous electron withdrawing substituents.

As we have hereinabove noted, it is a particularly surprising aspect of this invention that the initiator of the invention does not support homopolymerization of formaldehyde.

Another important factor in controlling polymerization is that the anion have only weakly basic components, such as fluoroalkyl, preferably fluoromethyl, on the periphery so as not to have competing sites for the acidic counterion of the propagating end of the polymer chain. In addition, the ion must be stable to the reaction conditions; disproportionation and oxidation are typical side reactions which can destroy the anion and lose the desired effect. Often the larger size anions exhibit higher solubility which further enhance reactivity.

Large borate ions are the preferred anions in the process of this invention. Included are tetraphenyl borate derivatives including tetrakis p-chlorophenyl borate, preferably fluoro-substituted tetraphenyl borates and derivatives thereof, most preferably fluoromethyl substituted tetraphenyl borates. Preferred species include tetrakis(p-fluorophenyl) borate, tetrakis(difluorophenyl)borate, tetrakis(trifluorophenyl) borate, tetrakis(tetrafluorophenyl)borate, tetrakis (pentafluorophenyl)borate, tetrakis(3,5-bis-trifluoromethyl phenyl)borate, tetrakis(3,5-bis-trifluoromethyl p-fluorophenyl) borate, tetrakis(3,5-bis-trifluoromethyl difluorophenyl)borate, tetrakis(3,5-bis-trifluoromethyl trifluorophenyl)borate, tetrakis(2,3,5,6-tetrafluoro-4-trialkylsilyl)borate where the trialkyl groups are t-butyl and isopropyl, methyl ortho phenyl-tris-pentafluorophenyl borate. Most preferred is tetrakis(3,5-bis-trifluoromethyl phenyl) borate.

The preferred initiator is triphenylmethyl tetrakis(3,5-bis-trifluoromethyl phenyl) borate.

The preferred counterion of the invention is prepared by the reaction of NaBF4 with the Grignard reagent formed from 3,5-bis(trifluoromethyl)bromobenzene in ether, followed by treatment with aqueous sodium carbonate and extraction of the product into ether, as described in Brookhart et al, Organometallics 11, pp. 3920–3922, 1992. This method is generally applicable for the prepartion of the other fluoroaromatic borates of the present invention as well.

The formaldehyde suitable for the process of the invention is anhydrous formaldehyde characterized by a total content of protonic species of less than 600, preferably less than 300 parts per million by weight. It is found satisfactory for the practice of this invention to generate anhydrous formaldehyde by thermolysis of 2-ethylhexylformal which is heated to 158° C. in a pyrolyzer to evolve a gaseous mixture of HCHO and alcohol. The gaseous stream passes into a partial condenser which separates the two. Out of the partial condenser comes liquid alcohol/hemiformal and formaldehyde having combined protonic species such as water and methanol concentrations of no greater than 300 parts per million by volume. The formaldehyde so produced is fed into the reaction medium of the invention.

The invention is further described in the following specific embodiments.

EXAMPLES

General Method of preparing Samples

Small slurry samples were withdrawn periodically for analysis. The solids content was determined gravimetrically. The polymer molecular weight was measured by gel permeation chromatography in hexafluoroisopropanol according to ASTM D5296-92. The concentration of comonomer in the polymer was determined by dissolving the copolymer in acetic anhydride containing 2% by volume of sulfuric acid, followed by neutralization of the acid with calcium hydroxide, and then gas chromotographic analysis of the liquid layer to measure the relative amounts of diacetates present. In Comparative Example 1 and Example 5, the composition of the liquor collected with each slurry sample was determined using an internal standard method and a centrifuge, when necessary, to give a separate liquid layer. Samples were injected into a gas chromatograph calibrated for the components present in the mixture. In Examples 1–4 the concentration of dioxolane in the solvent was estimated by taking the difference between the amount fed, the amount found in the polymer produced, and dividing by the amount of solvent fed.

Base stability, an indication of uniformity of comonomer incorporation in the polymer as discussed in Pichler et al., Collect. Czech. Chem. Commun., Vol. 30, 991–995 (1965), was determined by measuring the fraction of solids remaining after treatment of the polymer with potassium hydroxide in benzyl alcohol at 160° C. Further indications of the degree of randomness can be obtained by comparing the crystalline melting point from differential scanning calorimetry, ASTM E794-81 to those calculated according to the melting point depression equation in Flory, *Principles of Polymer Chemistry*, pp 568–571, Cornell University Press, Ithaca, 1953.

The semi-batch polymerizations of Examples 1–4 and Comparative Example 1 were carried out in glass reactors equipped with a mechanical stirrer, thermocouple, entry and sample ports, and immersed in a circulating water temperature bath. Formaldehyde, containing less than 300 ppm of water and methanol, were fed by demand controlled with a peristaltic pump through large bore tubing. Prior to use in the polymerization the reactor was dried under vacuum for 18 hours at 135° C. in a model 1430 oven made by Sheldon Manufacturing, Inc. of Cornelius, Oreg. The dried reactor was charged under nitrogen with n-heptane having a water content of ca. 10 ppm having been stored in a sealed container over activated type 4A molecular sieves available from EM Sciences, Gibbstown, N.J., and heated to a starting temperature of 40–50° C. The nitrogen purge was then removed, the solvent was saturated with formaldehyde for 0.5–1 min, initiator was added, and dioxolane, Aldrich Chemical Co., Milwaukee, Wis., comonomer feed from a syringe pump was started.

Comparative Example 1

250 g of heptane saturated with anhydrous formaldehyde and 12.91 g (4.9 wt %) of dioxolane were introduced into a rapidly stirred 1 liter reaction flask at 40° C. Polymerization was initiated by introduction of 45 ml of borontrifluoride etherate (Aldrich). After initiation of the reaction, additional dioxolane was added at 0.17 g/min. and formaldehyde was fed on demand. The reaction exotherm peaked at 46.5° C. and formaldehyde was consumed at an average rate of 1.26 g/min (3.0 g/min/l) over a 30 min. period. The reaction was terminated by adding 0.5 ml of a 50:50 by volume ratio of triethylamine and methanol to the polymerizer. The product was filtered and washed with methanol and acetone. The final product was a copolymer containing 1.45 mole % of dioxolane derived units, a number average molecular weight ($M_n$) of 39,500, 88.8% base stable and a melting point of 167.6° C. The average (equilibrium) dioxolane concentration in the reaction medium was 5.4 wt % and biproduct trioxane and trioxepane at the end of the reaction were 0.76 and 0.46 wt %.

Example 1

To 0.4948 g (0.56 mmole) of sodium tetrakis(3,5-bis-trifluoromethylphenyl)borate, dissolved in 4.057 ml of methylene chloride, was added 0.1120 g (0.553 mmole) of chlorodiphenylmethane (Reagent grade, Aldrich) at room temperature, to form a 0.14 M solution of diphenylmethyl-carbenium tetrakis(3,5-di-trifluoromethyl phenyl) borate in methylene chloride. The resulting mixture was transferred in a dry box through a 0.5 mm syringe filter into a dry vial with rubber septum cap.

85 g of dried heptane saturated with anhydrous formaldehyde and 0.64 g (0.75 wt %) of dioxolane were introduced into a rapidly stirred 250 ml reaction flask at 38° C. Polymerization was initiated by introduction of 0.5 ml of the 0.14 M diphenylmethylcarbenium tetrakis(3,5-bis-trifluoromethylphenyl)borate initiator solution in methylene chloride. After initiation, dioxolane was added at a rate of 1 g/min. and formaldehyde was added on demand. The temperature rose rapidly to 59° C. and stabilized at a formaldehyde feed rate of 1.4 g/min. After 10 min. the reaction was stopped and the polymer product isolated as in Comparative Example 1. 14.7 g of copolymer was produced, containing 1.7 mole % dioxolane. $M_n$ was 20,000, $M_w$ was 52,000. Base stability was 79.5%. Estimated concentration of dioxolane in the solution (from material balance) was 1.14 wt %.

Example 2

The reaction was carried out as in Example 1 except the initial temperature was 44° C., the initial dioxolane concentration was 0.33 wt % and 0.2 ml of the initiator solution was added. The formaldehyde polymerization rate was 0.4 g/min, the dioxolane feed rate was 0.09 g/min, the polymer contained 1.5 mole % dioxolane with $M_n$=13,000 and $M_w$=46,000 and 70.8 wt % base stable. Estimated dioxolane solution concentration was 1.15 wt %.

Example 3

The reaction was carried out as in Example 2 except that 1 ml of the initiator solution was added and no initial charge of dioxolane was added. During the run, dioxolane was added at 0.1 g/min. The HCHO polymerization rate was 2.0 g/min and the product contained 2.38 mole % dioxolane, 91.46 wt % base stable, $M_n$=42,000, $M_w$=101,000 and $T_m$=164° C. with $\Delta H_f$=165 J/gm (heat of fusion). The estimated dioxolane solution concentration was 0.61 wt %.

Example 4

To 0.4948 g (0.56 mmole) of sodium tetrakis(3,5-bis-trifluoromethylphenyl)borate, prepared according to the method described in Brookhart et al., Organometallics 11, pp. 3920–3922, 1992, dissolved in 4.057 ml of methylene chloride was added 0.154 g (0.553 mmole) of chlorotriphenylmethane (Reagent grade, Aldrich) at room temperature, to form a 0.14 M solution of triphenylmethylcarbenium tetrakis(3,5-bis-trifluoromethyl phenyl) borate in methylene chloride. The resulting mixture was transferred in a dry box through a 0.5 mm syringe filter into a dry vial with rubber septum cap.

The polymerization was carried out as in Example 3 except the initiator was 0.5 ml of 0.14 M triphenylmethylcarbenium tetrakis(3,5-bis-trifluoromethylphenyl)borate in methylene chloride. The HCHO polymerization rate was 1.0 g/min and dioxolane was fed at a rate of 0.1 g/min. Polymer, isolated after 13 min., contained 3.33 mole % of dioxolane, 90.3 wt % base stable and $M_n$=30,000, $M_w$=120,000. The estimated dioxolane solution concentration was 0.38 wt %.

Example 5

The reaction was carried out in a conical 250 ml reaction flask with spill over to collect product continuously. The initial charge was 140 g of heptane (water content 8.4 ppm) and 60 g of dried, acetate capped polyoxymethylene in the form of particles ca. 200 micrometers in diameter. At an initial temperature of 48° C. and saturated with formaldehyde, a continuous feed comprising 0.28 M diphenylmethylcarbenium tetrakis(3,5-bis-trifluoromethylphenyl) borate in methylene chloride of 1 ml/hr, dioxolane at 0.1 g/min and heptane at 6 g/min was added. The temperature settled near 61° C. at a polymerization rate of 1.7 g/min. Samples were removed at 20 min intervals over a 2 hour period and the reaction was carried out a total of 170 min. The solutions, throughout the run, contained 0.6–1.7 (average about 1) wt % dioxolane, 0.06–0.08 of 1,3,5-trioxane and no detectable amount of trioxepane. The mole % of dioxolane in the intermediate samples was 1.04 to 1.6 mole % and in the final product, 1.70 mole %. The copolymer was 77.6–80.5 wt % base stable with $M_n$=36–38,000, $M_w$=114–117,000.

What is claimed is:

1. A process for the copolymerization of formaldehyde with cyclic ethers comprising:

Contacting in a reactor at a temperature in the range of 0–80° C., an aromatic or saturated aliphatic hydrocarbon liquid; one or more cyclic ethers selected from the group consisting of ethylene oxide, 1,3-dioxolane, 1,3,5-trioxycylcoheptane, 1,3,6-trioxycyclooctane, and 1,3-dioxycycloheptane, said cyclic ether being at a concentration of at least 0.01 molar in said hydrocarbon liquid; a cationic initiator comprising an anion formed from a halogen containing tetraphenyl borate, and a cation; and formaldehyde containing less than 600 parts per million of water and alcohol combined, the molar feed ratio of formaldehyde to cyclic ether being in the range of 200:1 to 50:1;

maintaining the temperature of the reactants in the range of 0–80° C. thereby forming a copolymer, said copolymer comprising monomer units of formaldehyde and said one or more cyclic ethers in a formaldehyde to cyclic ether molar ratio in the range of ca. 200:1 to ca. 50:1; and separating the product.

2. The process of claim 1 wherein the a starting concentration of the cyclic ether is at least ca. 0.01 molar.

3. The process of claim 1 conducted as a continuous polymerization.

4. The process of claim 1 conducted as a semi-batch polymerization.

5. The process of claim 1 wherein the temperature is 40–50° C.

6. The process of claim 1 wherein the reaction mixture is agitated.

7. The process of claim 1 wherein the cyclic ether is 1,3-dioxolane.

8. The process of claim 1 wherein the anion is selected from the group consisting of tetrakis p-chlorophenyl borate, tetrakis(p-fluorophenyl) borate, tetrakis(difluorophenyl) borate, tetrakis(trifluorophenyl)borate, tetrakis(tetrafluorophenyl)borate, tetrakis(pentafluorophenyl)borate, tetrakis(3,5-bis-trifluoromethyl phenyl)borate, tetrakis(3,5-bis-trifluoromethyl p-fluorophenyl) borate, tetrakis(3,5-bis-trifluoromethyl difluorophenyl)borate, tetrakis(3,5-bis-trifluoromethyl trifluorophenyl)borate, tetrakis(2,3,5,6-tetrafluoro-4-trialkylsilyl)borate where the trialkyl groups are t-butyl and isopropyl, methyl ortho phenyl-tris-pentafluorophenyl borate.

9. Process of claim 8 wherein the anion is tetrakis(3,5-bis-trifluoromethyl phenyl)borate.

10. The process of claim 9 wherein the cation is triphenyl methyl.

11. The process of claim 1 wherein the mole ratio of formaledehyde to cyclic ether is in the range of 80:1 to 60:1.

12. The process of claim 1 wherein the hydrocarbon liquid is heptane or cyclohexane.

13. The process of claim 1 wherein the formaldehyde contains less than 300 ppm of water and alcohol.

* * * * *